(12) United States Patent
Chang et al.

(10) Patent No.: US 10,811,316 B2
(45) Date of Patent: Oct. 20, 2020

(54) METHOD AND SYSTEM OF FORMING INTEGRATED CIRCUIT

(71) Applicant: TAIWAN SEMICONDUCTOR MANUFACTURING COMPANY LTD., Hsinchu (TW)

(72) Inventors: Ka Fai Chang, Hsinchu (TW); Fong-Yuan Chang, Hsinchu County (TW); Chin-Chou Liu, Hsinchu County (TW); Yi-Kan Cheng, Taipei (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 16/102,589

(22) Filed: Aug. 13, 2018

(65) Prior Publication Data
US 2020/0051863 A1 Feb. 13, 2020

(51) Int. Cl.
*H01L 21/822* (2006.01)
*H01L 23/522* (2006.01)
*H01L 23/528* (2006.01)
*H01L 23/00* (2006.01)

(52) U.S. Cl.
CPC ...... *H01L 21/8221* (2013.01); *H01L 23/5227* (2013.01); *H01L 23/5286* (2013.01); *H01L 24/42* (2013.01)

(58) Field of Classification Search
CPC ............. G06F 17/5081; G06F 17/5036; G06F 17/5009; H01L 23/5227; H01L 23/5228; H01L 23/5222; H01L 23/5226; H01L 23/5223; H01L 23/8221

USPC .......... 257/E23.144, 758, 499; 716/115, 111, 716/136, 113, 106
See application file for complete search history.

(56) References Cited

U.S. PATENT DOCUMENTS

| | | | |
|---|---|---|---|
| 6,842,727 B1 * | 1/2005 | Hayashi | G06F 30/367 703/18 |
| 8,802,504 B1 | 8/2014 | Hou et al. | |
| 8,803,292 B2 | 8/2014 | Chen et al. | |
| 8,803,316 B2 | 8/2014 | Lin et al. | |
| 8,993,380 B2 | 3/2015 | Hou et al. | |
| 9,281,254 B2 | 3/2016 | Yu et al. | |
| 9,299,649 B2 | 3/2016 | Chiu et al. | |
| 9,372,206 B2 | 6/2016 | Wu et al. | |
| 9,425,126 B2 | 8/2016 | Kuo et al. | |
| 9,443,783 B2 | 9/2016 | Lin et al. | |
| 9,496,189 B2 | 11/2016 | Yu et al. | |
| 2006/0036980 A1 * | 2/2006 | Kobayashi | G06F 30/367 716/113 |

(Continued)

*Primary Examiner* — Mohammed Shamsuzzaman
*Assistant Examiner* — Aaron J Gray
(74) *Attorney, Agent, or Firm* — WPAT, P.C., Intellectual Property Attorneys; Anthony King

(57) ABSTRACT

A method for forming an integrated circuit (IC) is provided. The method includes the following operations. A circuit layout including a first load region and a second load region is received. A full power network of the circuit layout is obtained. The full power network is transformed into a first power network according to the first load region. A first power simulation is performed upon the first power network. The full power network is transformed into a second power network according to the second load region. A second power simulation is performed upon the second power network. The IC is fabricated according to the circuit layout.

20 Claims, 16 Drawing Sheets

(56) References Cited

U.S. PATENT DOCUMENTS

2015/0269303 A1\* 9/2015 Tsai ..................... G06F 30/398
716/112

\* cited by examiner

METHOD AND SYSTEM OF FORMING INTEGRATED CIRCUIT

BACKGROUND

In advanced semiconductor fabrication technologies, the feature density and operating frequency of devices are being progressively raised in order to achieve better performance. To enable such advances, electronic design automation tools are widely used for facilitating design flows and ensuring the functional integrity of the manufactured integrated circuits (IC). The electronic design automation tools aid in establishing a software platform to evaluate the physical performance and electrical properties of the IC before the chip is fabricated. A variety of built-in device models and design rules are used to verify the performance of the circuit design, such as the functionality, power consumption, and feature geometries. The software platform can also simulate the physical behaviors and characteristics of the IC components in operation.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1:
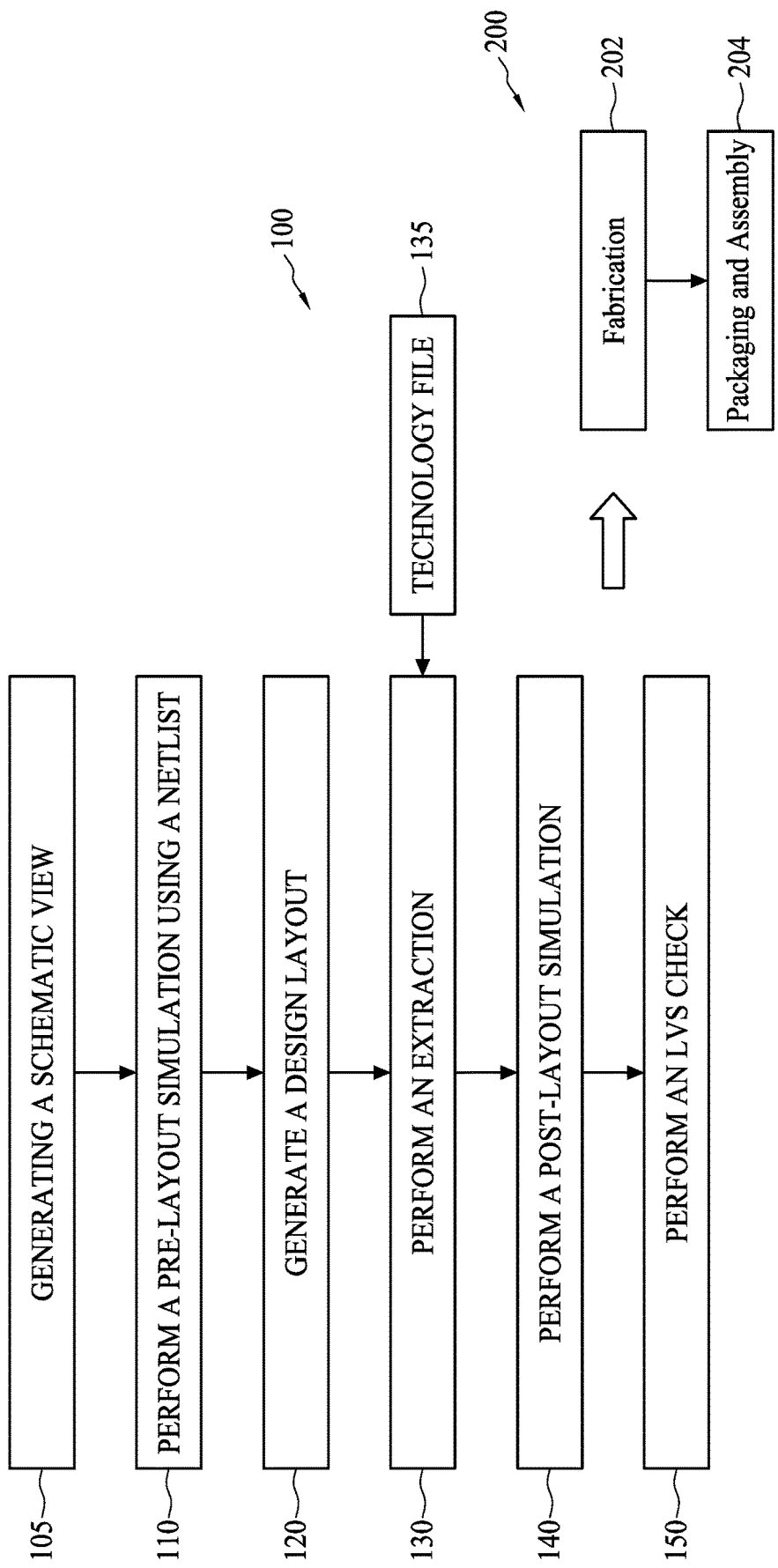
FIG. 1 is a flowchart of a chip design flow and a chip manufacturing flow of an IC chip in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Embodiments of the present disclosure are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

Further, spatially relative terms, such as "beneath," "below," "lower," "above," "upper," "lower," "left," "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. It should be understood that when an element is referred to as being "connected to" or "coupled to" another element, it may be directly connected to or coupled to the other element, or intervening elements may be present.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

FIG. 1 is a flowchart of a chip design flow 100 and a chip manufacturing flow 200 of an IC chip in accordance with some embodiments. In some embodiments, the integrated circuit can be a digital circuit, an analog circuit, a mixed-signal circuit, a static random access memory (SRAM) circuit, an embedded SRAM circuit, a dynamic random access memory (DRAM) circuit, an embedded DRAM circuit, a non-volatile memory circuit such as FLASH, EPROM, or E²PROME, a field-programmable gate circuit, or any suitable integrated circuit. The chip manufacturing flow 200 manufactures the integrated device based on a result of the design flow 100.

Referring to FIG. 1, the design flow 100 may include generating schematic netlists of the devices using a process design kit (PDK) file (operation 105). The operation 105 can be performed on a platform such as VIRTUOSO®, which is commercially available from CADENCE DESIGN SYSTEMS, Inc. (San Jose, Calif.).

In some embodiments, the design flow 100 may include performing a pre-layout simulation using a netlist (operation 110). In some embodiments, the pre-layout simulation may be performed on a pre-layout simulator, such as HSPICE®, which is commercially available from SYNOPSYS, Inc. (San Jose, Calif.), SPECTRE®, which is commercially available from CADENCE DESIGN SYSTEMS, Inc. (San Jose, Calif.), or any other commercially available pre-layout simulator. The pre-layout simulation may be performed using a netlist file that is generated from the PDK file. The PDK file may be used to generate a netlist for the pre-layout simulation. In some embodiments, the netlist may be referred to as a transistor netlist, e.g., a pre-layout transistor netlist, or a gate-level netlist.

In some embodiments, the PDK file can include a plurality of device model cards that are assigned to respective devices. For example, the devices can include an N-type metal-oxide-semiconductor field effect transistor (MOSFET), a P-type MOSFET, a double-diffused MOS (DMOS) transistor, a complementary MOS (CMOS) transistor, a p/n junction diode, a resistor, a capacitor, an inductor, a bipolar transistor, a high-voltage (HV) device, a device formed by an HV Bipolar-CMOS-DMOS (HV BCD) process, and/or other semiconductor devices. The device model cards can include various dimensional parameters, device models, terminals, and/or other electrical parameters. The dimensional parameters can include at least one of length, width, depth, thickness, area, perimeter, and/or other spatial parameters of each device.

In some embodiments, the design flow 100 may include generating a design layout (operation 120). In some embodiments, the design layout may be generated as a Graphic Database System (GDS) file (e.g., a GDSII file). The design layout includes a database file comprising various layers that are drawn to represent the integrated circuit. The operation 120 of generating the design layout of the integrated circuit may correspond to the simulation result of the pre-layout simulation. For example, if the pre-layout simulation passes the behavior check and/or the function check, the minimum rule and/or large attributes of the devices may be used to generate the design layout of the integrated circuit. In some embodiments, the operation 120 of generating the design layout can be performed on a platform, such as VIRTUOSO®, which is commercially available from CADENCE DESIGN SYSTEMS, Inc. (San Jose, Calif.).

In some embodiments, the design flow 100 may include performing an extraction (operation 130). The operation 130 of performing the extraction may include a layout parasitic extraction (LPE) and/or a resistance-capacitance (RC) extraction. The LPE may be a layout parameter extraction from the design layout for transistors, resistors, capacitors, inductors, and/or other semiconductor devices. The RC extraction may extract electrical characteristics from the database file of the design layout. In some embodiments, the layout parameters and/or electrical characteristics may be provided in a technology file 135. In the technology file 135, dimensional characteristics of devices may be extracted from the database file of the design layout. The extracted dimensional characteristics may be applied to various device models for generating the electrical characteristics. In some embodiments, the electrical characteristics may include capacitances and resistances in the electronic devices and on the various interconnects (also generally referred to as "nets") that electrically connect the aforementioned devices.

In some embodiments, the design flow 100 may include performing a post-layout simulation (operation 140). In some embodiments, the operation 140 may be performed on a post-layout simulator, such as HSPICE®, which is commercially available from SYNOPSYS, Inc. (San Jose, Calif.), SPECTRE®, which is commercially available from CADENCE DESIGN SYSTEMS, Inc. (San Jose, Calif.), or another commercially-available post-layout simulator.

In some embodiments, the design flow 100 may include performing a layout versus schematic (LVS) check. The LVS check may be performed to ensure the generated layout corresponds to the design. An LVS tool recognizes circuit elements and connections therebetween from patterns in the generated layout, and produces a post-layout netlist representing the recognized circuit elements and connections. The LVS tool then checks whether the post-layout netlist generated from the layout is equivalent to the pre-layout netlist generated from the design.

In some embodiments, the chip manufacturing flow 200 includes a fabrication stage 202 and a packaging and assembly stage 204.

During the fabrication stage 202, the photomask(s) is used, for example, for one patterning operation for forming a feature of the integrated devices, such as gate lines of transistors, source or drain regions for the transistors, metal lines for interconnects and vias for the interconnects, on a wafer.

During the packaging and assembly stage 204, the integrated devices on the wafer are diced into IC chips and are packaged while taking into consideration, for example, protection from mechanical damage, cooling, electromagnetic interference and protection from electrostatic discharge. An IC chip may be assembled with other components for use.

The design flow 100 and the chip manufacturing flow 200 in FIG. 1 are exemplary. Other sequences of the stages, or partition of the stages, and/or additional stages before, between or after the stages shown are within the applicable scope of the present disclosure.

During the post-layout simulation (operation 140), the circuit layout of the integrated circuit is checked to ensure that the circuit layout satisfies certain manufacturing design rules. The operation 140 is discussed in detail below.

Figure 2:
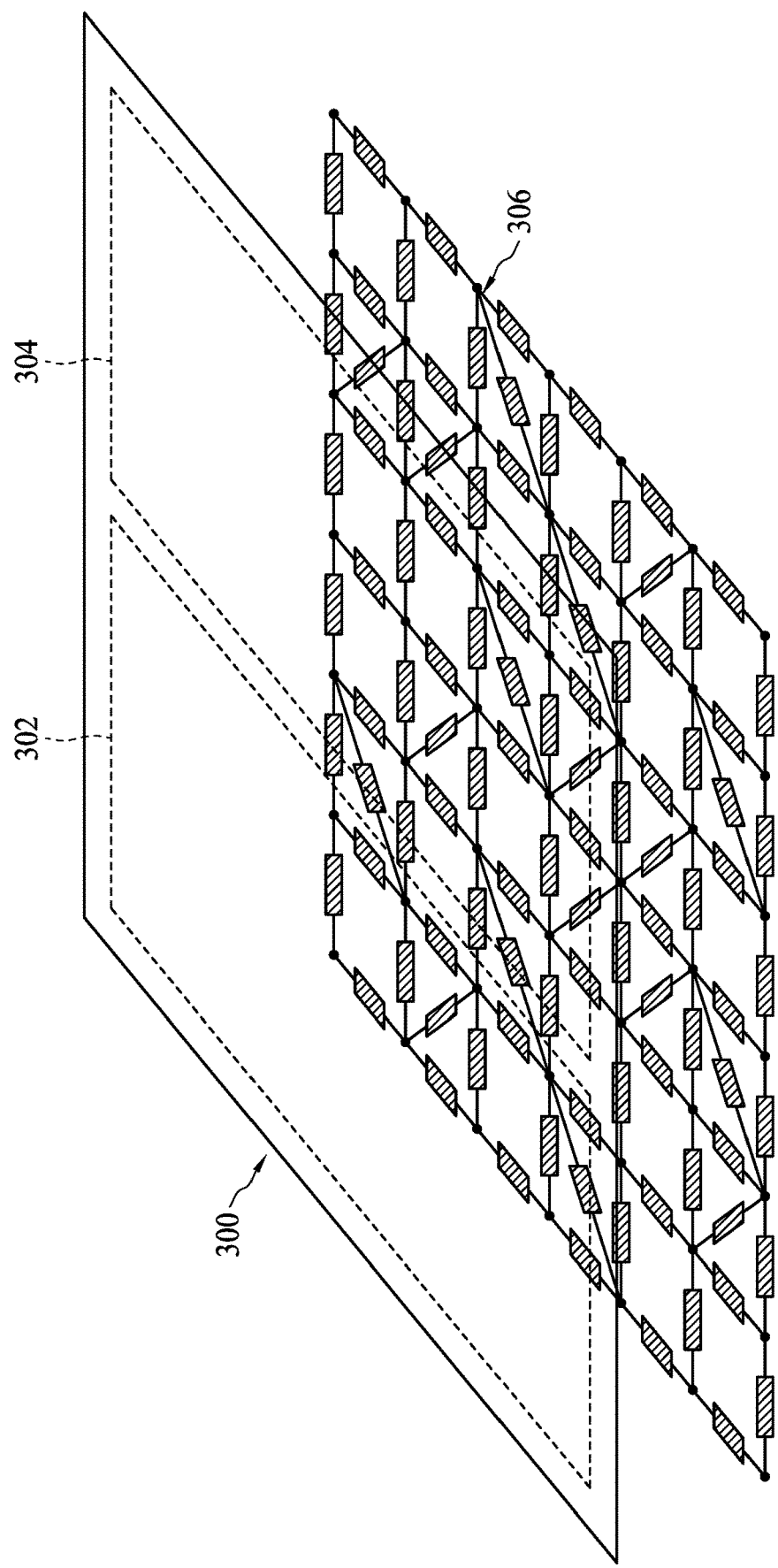
FIG. 2, FIG. 3, and FIG. 4 are diagrams illustrating a circuit layout in accordance with some embodiments of the present disclosure.
Figure 3:
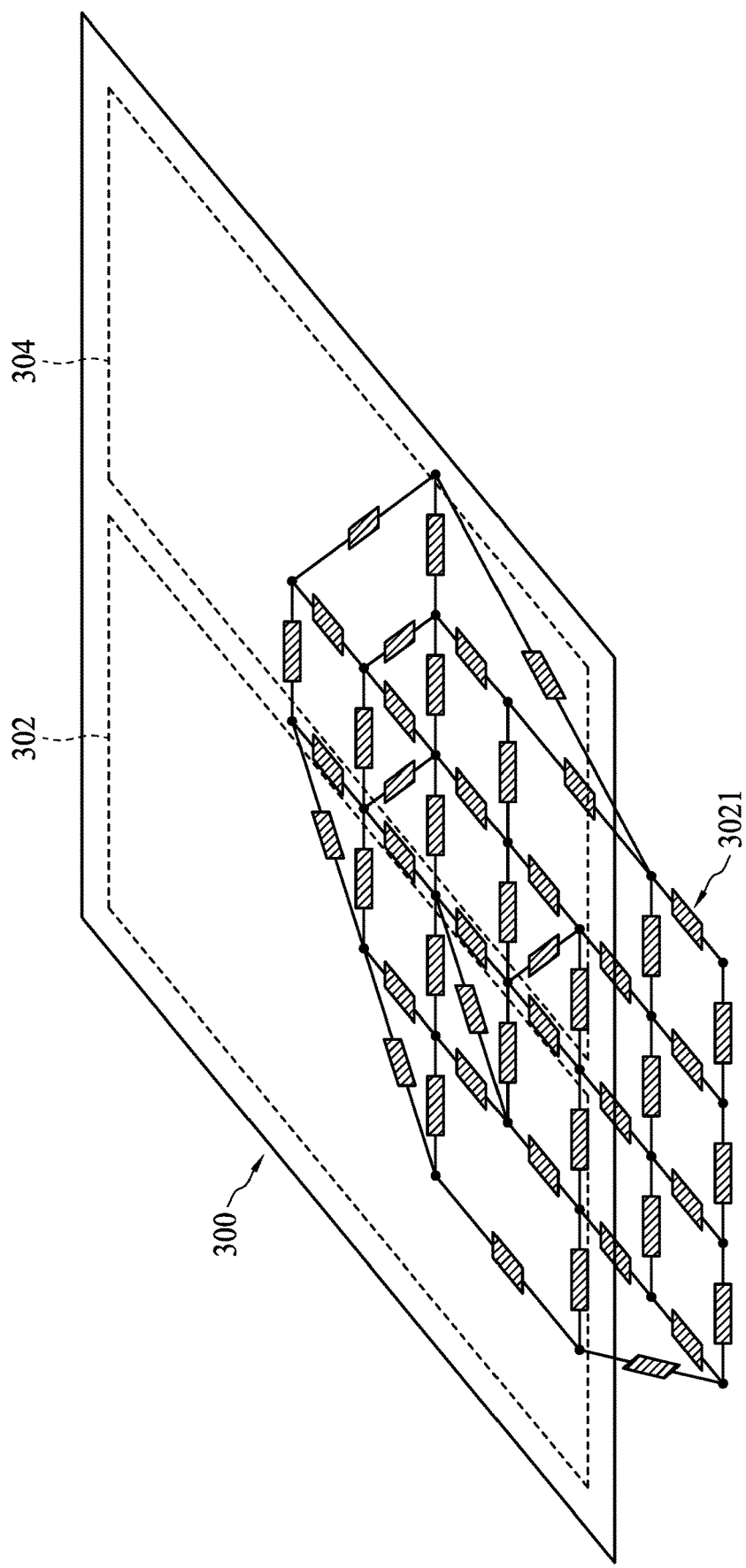
Figure 4:
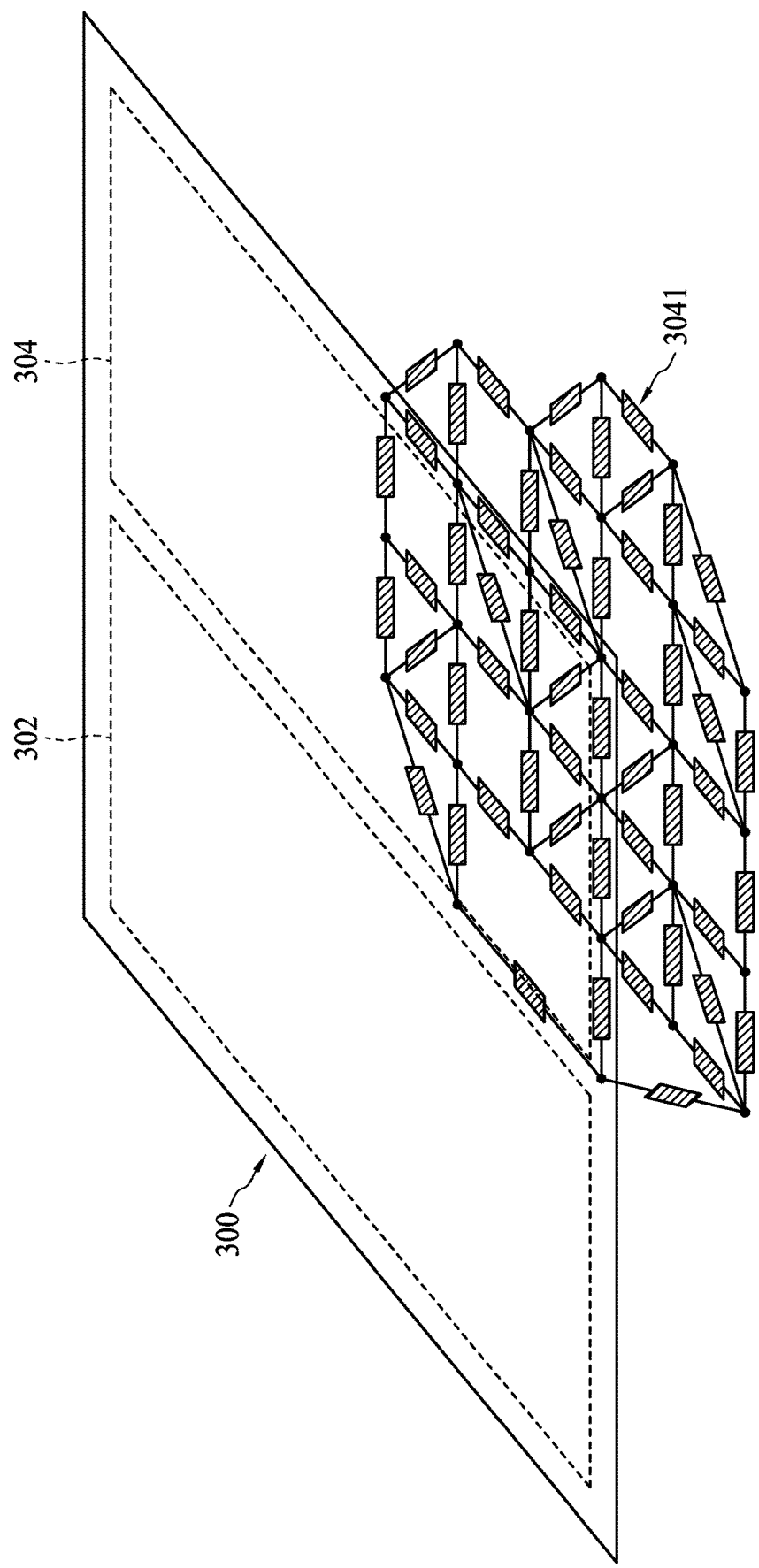

FIG. 2, FIG. 3, and FIG. 4 are diagrams illustrating a circuit layout 300 in accordance with some embodiments of the present disclosure. Referring to FIG. 2, the post-layout simulation (operation 140) is performed on the circuit layout 300. The circuit layout 300 may be a semiconductor product. The semiconductor product may include an IC, a system on a chip (SoC), or other integrated device. In some embodiments, the circuit layout 300 includes a first load region 302 and a second load region 304. The first load region 302 and the second load region 304 may be different functional blocks or modules of the circuit layout 300. It should be noted that the elements in the circuit layout 300 are simplified for better understanding. The elements may include transistor, resistor, capacitor, or other electrical component.

The arrangement (e.g. location and size) of the first load region 302 and the second load region 304 is not limited to FIG. 2.

In some embodiments, the post-layout simulation includes a full power simulation. The full power simulation may be a power integrity simulation. During the full power simulation, the circuit layout 300 may be transformed into a full power network 306. The full power network 306 may be an equivalent circuit of the circuit layout 300. In some existing approaches, the full power simulation is performed on the full power network 306 and thus the simulation time may be increased as the complexity of circuit layout 300 is increased.

In some embodiments of the present disclosure, the problem of increased simulation time mentioned above may be alleviated by reducing the full power network 306 as described below. Referring to FIG. 3, in some embodiments, during the post-layout simulation, the full power network 306 (shown in FIG. 2) may be transformed into a first power network 3021 according to the first load region 302. A first power simulation is then performed on the first power network 3021. In some embodiments, the first power network 3021 may include a densely meshed region and a roughly meshed region. The densely meshed region may correspond to the first load region 302. The roughly meshed region may correspond to the peripheral region (e.g., the second load region 304), which is low activity region in the first power simulation. It should be noted that the first power network 3021 may be an equivalent circuit of the combination of the densely meshed region and the roughly meshed region.

Referring to FIG. 4, after the first power simulation, the full power network may be transformed into a second power network 3041 according to the second load region 304. A second power simulation is then performed on the second power network 3041. It should be noted that the first power simulation in FIG. 3 is independent from the second power simulation in FIG. 4. Similar to the first power network 3021, the second power network 3041 may include a densely meshed region and a roughly meshed region, and the detailed description is omitted for brevity.

Briefly, referring to FIG. 3 and FIG. 4, the first power network 3021 and the second power network 3041 are dynamically assigned according to the activities of the first load region 302 and the second load region 304, respectively. For example, when the first load region 302 is the main region for simulation, the full power network 306 (shown in FIG. 2) may be transformed to the first power network 3021. The full power network 306 may be dynamically simplified or reduced into the first power network 3021 or the second power network 3041, respectively. The first power simulation is performed independently on the first power network 3021 and the second power simulation is performed independently on the second power network 3041. Thus, the simulation time may be decreased as the power simulation is performed on the simplified or reduced power network (i.e., the first power network 3021 or the second power network 3041), and the accuracy of the power simulation is still maintained.

Figure 5:
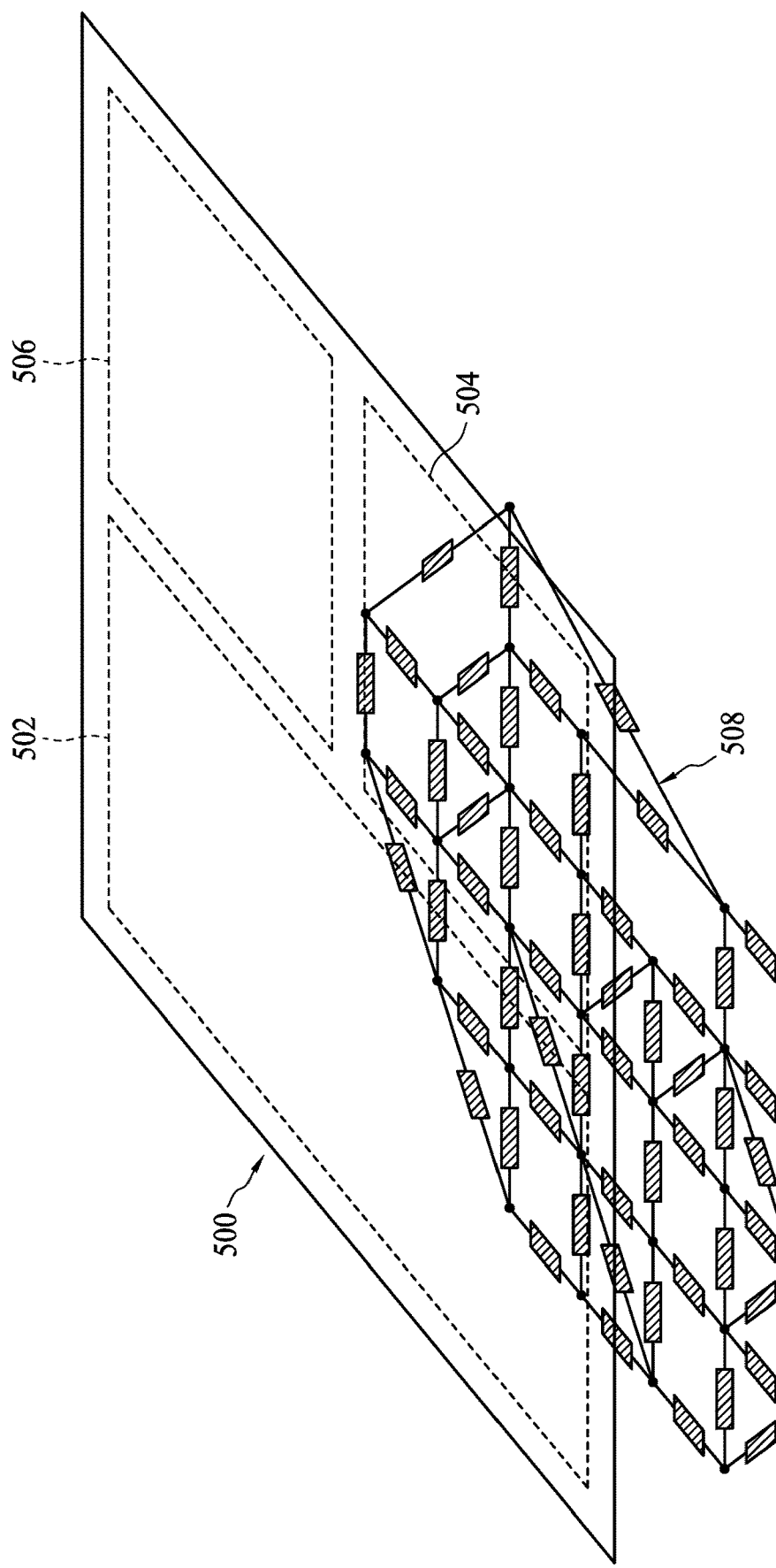
FIG. 5 is a diagram illustrating a circuit layout in accordance with some embodiments of the present disclosure.

FIG. 5 is a diagram illustrating a circuit layout 500 in accordance with some embodiments of the present disclosure. Referring to FIG. 5, in addition to a first load region 502 and a second load region 504, the circuit layout 500 may further include a third load region 506. In some embodiments, the full power network 306 (shown in FIG. 2) may be transformed into a third power network 508 according to the first load region 502 and the third load region 506, respectively. Similar to the configuration shown in FIG. 4 and FIG. 5, the third power network 508 may include a densely meshed region and a roughly meshed region, and the detailed description is omitted for brevity. It should be noted that the third power network 508 may be an equivalent circuit of the combination of the densely meshed region (i.e., corresponding to the first load region 502 and the third load region 506) and the roughly meshed region (i.e., corresponding to the second load region 504). Thus, a third power simulation is performed on the third power network 508. The full power network may also be transformed according to a plurality of load regions depending on the requirements of the power simulation.

Figure 6:
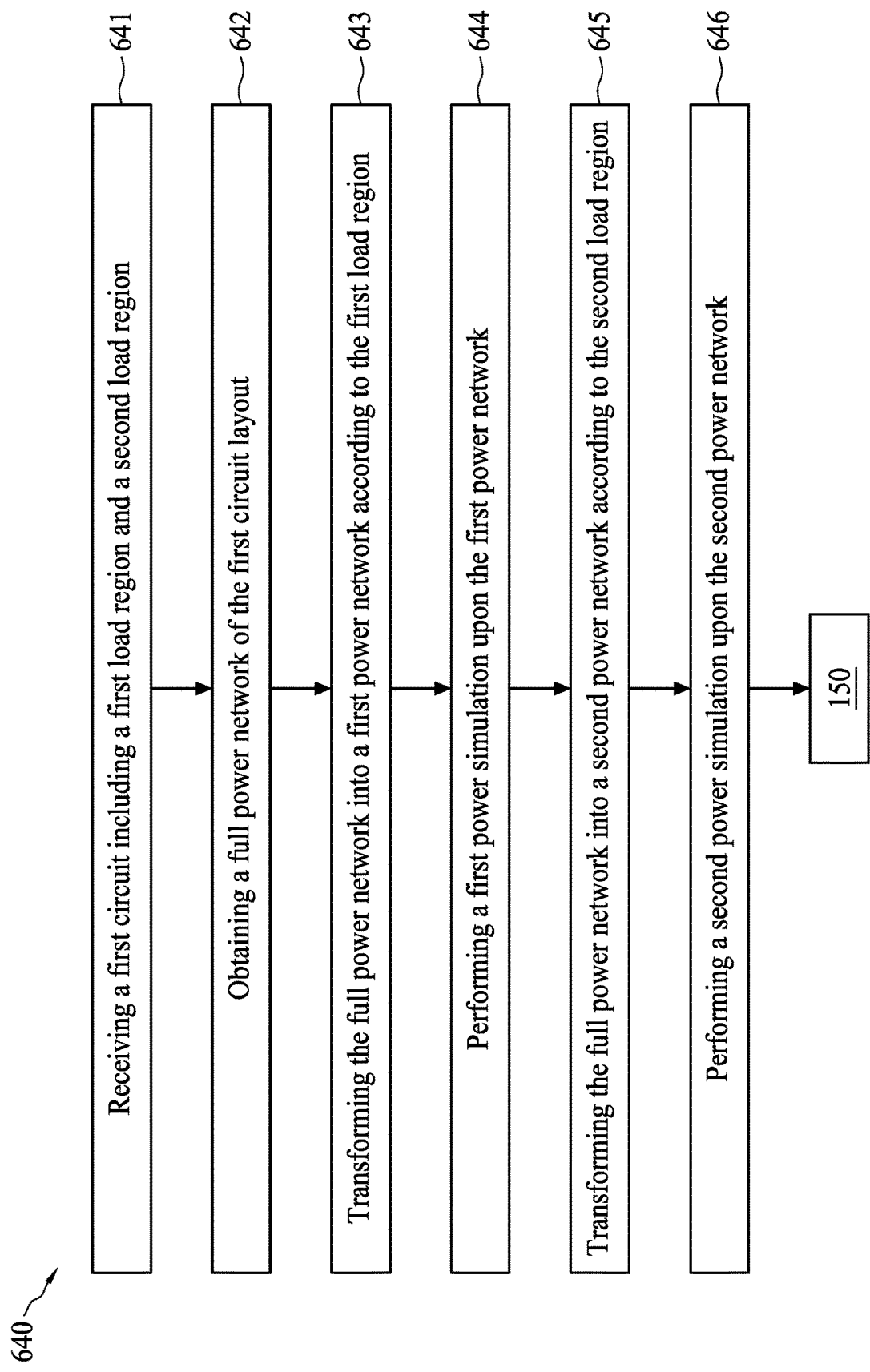
FIG. 6 is a flowchart illustrating a post-layout simulation in accordance with some embodiments of the present disclosure.

FIG. 6 is a flowchart illustrating a post-layout simulation 640 in accordance with some embodiments of the present disclosure. The post-layout simulation 640 may be performed on the circuit layout 300 in FIG. 2, FIG. 3, and FIG. 4. The post-layout simulation 640 may include operations 641 to 646.

In operation 641, a circuit layout 300 is received. The circuit layout 300 may include a first load region 302 and a second load region 304. In operation 642, a full power network 306 of the circuit layout 300 is obtained. In operation 643, the full power network 306 is transformed into a first power network 3021 according to the first load region 302. In operation 644, a first power simulation is performed upon the first power network 3021. In operation 645, the full power network 306 is transformed into a second power network 3041 according to the second load region 304. In operation 646, a second power simulation is performed upon the second power network 3041. The detailed descriptions are similar to the descriptions in FIG. 2, FIG. 3, and FIG. 4, and are omitted herein for brevity.

As described above, the full power network 306 may be dynamically simplified or reduced into the first power network 3021 or the second power network 3041 depending on which load region is under power simulation. The first power simulation is performed independently on the first power network 3021 and the second power simulation is performed independently on the second power network 3041. Thus, the simulation time may be decreased as the power simulation is performed on the simplified or reduced power network (i.e., the first power network 3021 or second power network 3041), and the accuracy of the power simulation is maintained.

Figure 7:
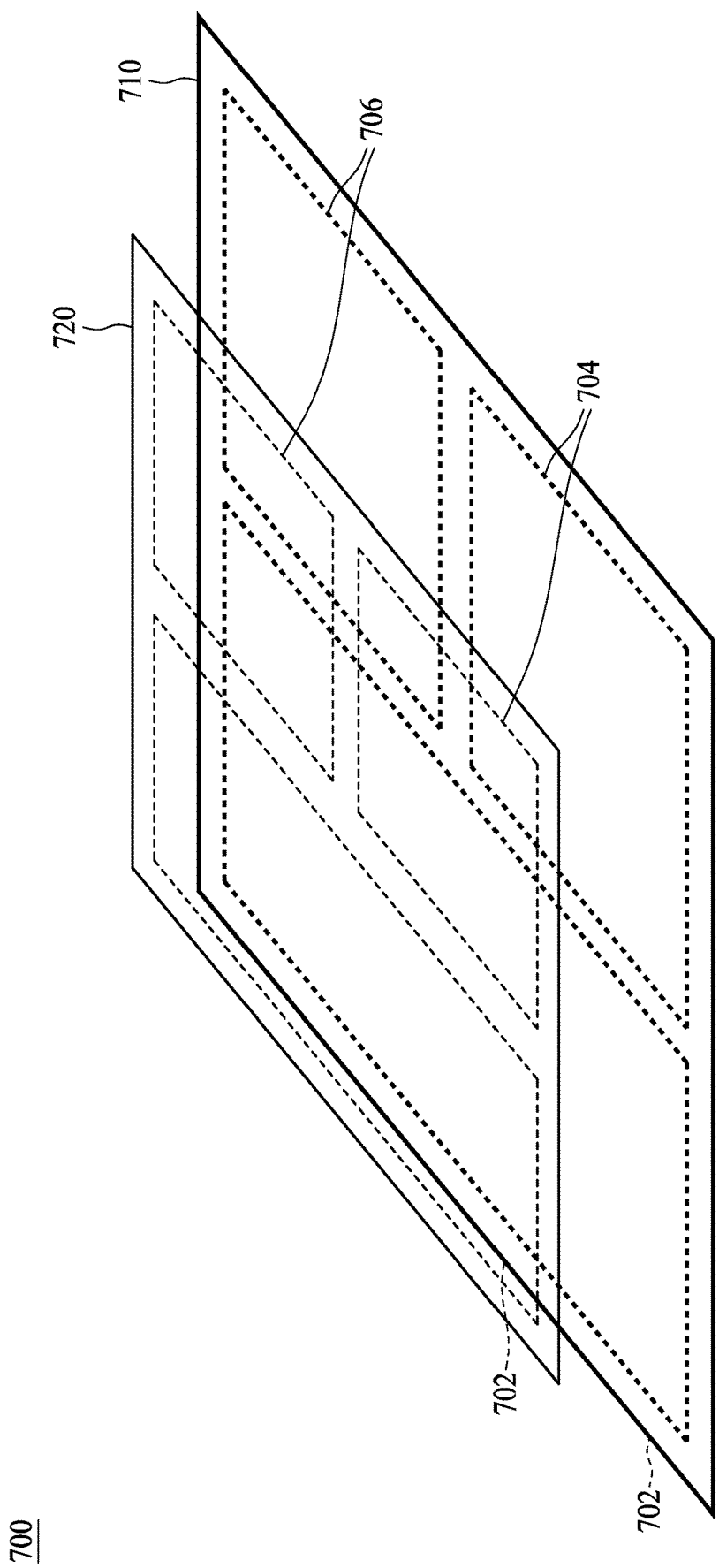
FIG. 7 is a diagram illustrating a circuit layout in accordance with some embodiments of the present disclosure.
Figure 8:
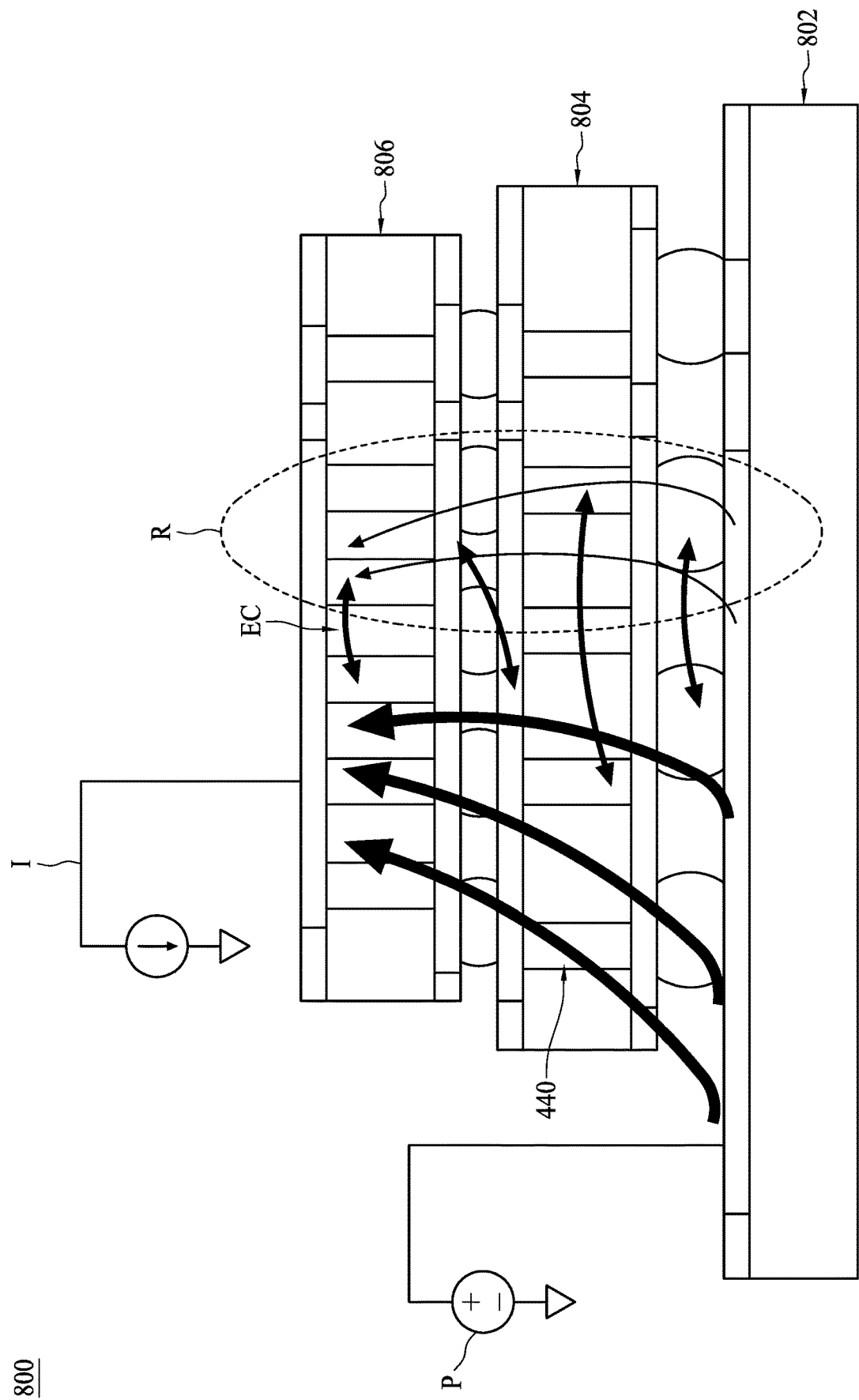
FIG. 8 is a cross-sectional view of an IC in accordance with some embodiments of the present disclosure.

FIG. 7 is a diagram illustrating a circuit layout 700 in accordance with some embodiments of the present disclosure. FIG. 8 is a cross-sectional view of an IC 800 in accordance with some embodiments of the present disclosure. FIG. 9, FIG. 10, FIG. 11, and FIG. 12 are diagrams illustrating different power networks of the IC 800 in accordance with some embodiments of the present disclosure. It should be noted that the elements in the circuit layout 700 are simplified for better understanding. The elements may include transistor, resistor, capacitor, or other electrical component.

Referring to FIG. 7 and FIG. 8, in some embodiments, the circuit layout 700 includes a first circuit layout 710 and a second circuit layout 720 over the first circuit layout 710. In some embodiments, the IC 800 may be a three-dimensional (3D) IC. The IC 800 may include a plurality of chip packages. For example, the first chip package 804 may be overlaid on a substrate 802, a board, a wafer, or other chips or chip packages. The first chip package 804 and the second chip package 806 may include a memory device, a processor, other chip logic, or a combination thereof. The second chip package 806 may be positioned on the first chip package 804 using a CoWoS-like process flow. The first circuit layout 710 may correspond to the first chip package 804 and the second circuit layout 720 may correspond to the second chip package 806. The IC 800 may be fabricated according to the circuit layout 700. It should be noted that the circuit layout 700 and the IC 800 may include more than two chip packages, and the example provided herein is not intended to be limiting. Further, the first circuit layout 710 and the second circuit layout 720 may be any two adjacent layers of the circuit layout 700.

Figure 9:
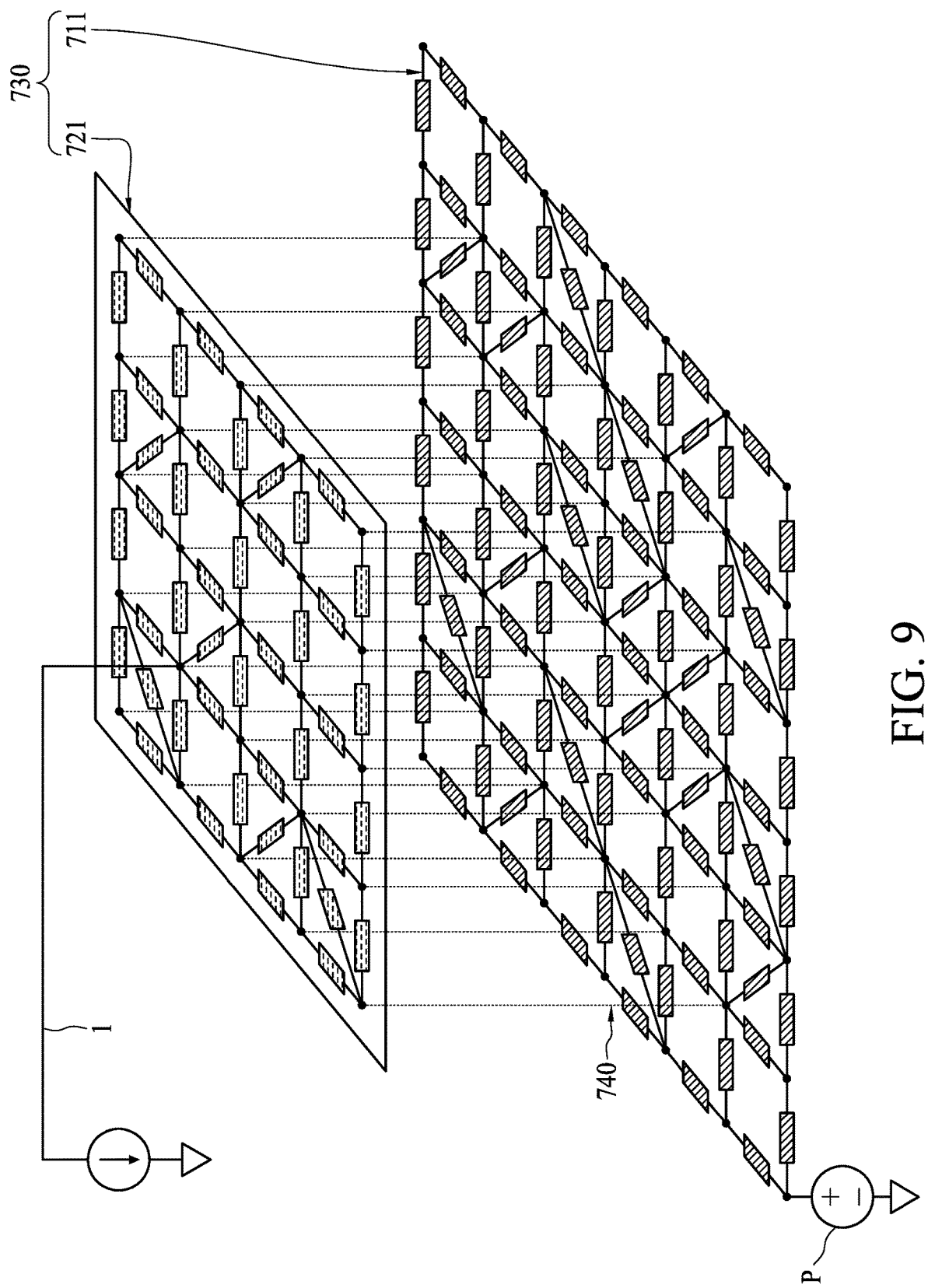
FIG. 9, FIG. 10, FIG. 11, and FIG. 12 are diagrams illustrating different power networks of the IC in accordance with some embodiments of the present disclosure.

Referring to FIG. 7 and FIG. 9, during the full power simulation, a power source P is coupled to the circuit layout 700 and a current I passes through the circuit layout 700. The circuit layout 700 may be transformed into a full power network 730. The full power network 730 may include a first sub-power network 711 and a second sub-power network 721 corresponding to the first circuit layout 710 and the second circuit layout 720, respectively. The first sub-power network 711 is coupled to the second sub-power network 721 through a plurality of paths 740 (i.e., the routes through which the current may pass). As described above, in some existing approaches, the full power simulation is performed on the full power network 730. Thus, some insignificant electrical coupling EC (shown in FIG. 8) outside the main simulation region or the region R (shown in FIG. 8) with low activity region in the simulation may also be utilized. The simulation time may be increased as the complexity of circuit layout 700 is increased.

In some embodiments of the present disclosure, the problem of increased simulation time mentioned above may be alleviated by reducing the full power network 730 as described below. Referring to FIG. 7, FIG. 10, FIG. 11, and FIG. 12, in some embodiments, during the post-layout simulation, a first current I1 is applied to a first load region 702 within a first time period, a second current I2 is applied to a second load region 704 within a second time period, and the first current I1 and a third current I2 are applied to the first load region 704 and a third load region 706, respectively, within a third time period. The first time period is free from overlapping the second time period and the third time period. The second time period is free from overlapping the third time period. As mentioned above, the first load region 702, the second load region 704, and the third load region 706 may be different functional blocks or modules of the circuit layout 700. The arrangement (e.g. location and size) of the first load region 702, the second load region 704, and the third load region 706 is not limited to FIG. 7.

Figure 10:
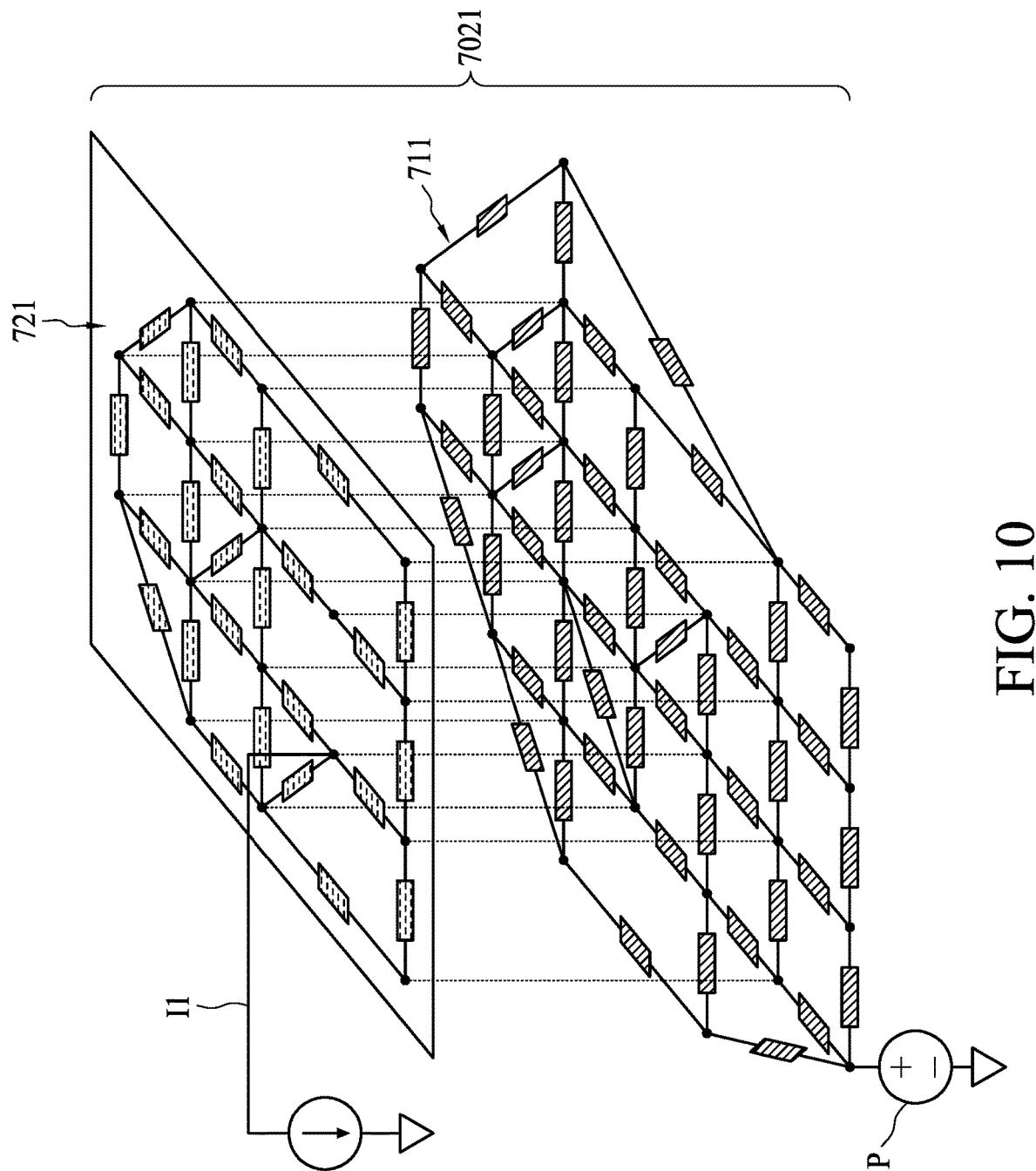

Referring to FIG. 10, within the first time period, the full power network 730 (shown in FIG. 7) is transformed into a first power network 7021 according to the first load region 702 (shown in FIG. 7). In some embodiments, a first power simulation is then performed on the first load region 702 based on the first current I1 passing through the first power network 7021 within the first time period. The first power network 7021 may include at least a portion of the first sub-power network 711 and at least a portion of the second sub-power network 721. In some embodiments, the first power network 7021 may include a densely meshed region and a roughly meshed region. The densely meshed region may correspond to the first load region 702, through which the first current I1 mainly passes. The roughly meshed region may correspond to the peripheral region (e.g., the second load region 704 and the third load region 706), which is low activity region in the first power simulation. It should be noted that the first power network 7021 may be an equivalent circuit of the combination of the densely meshed region and the roughly meshed region.

Figure 11:
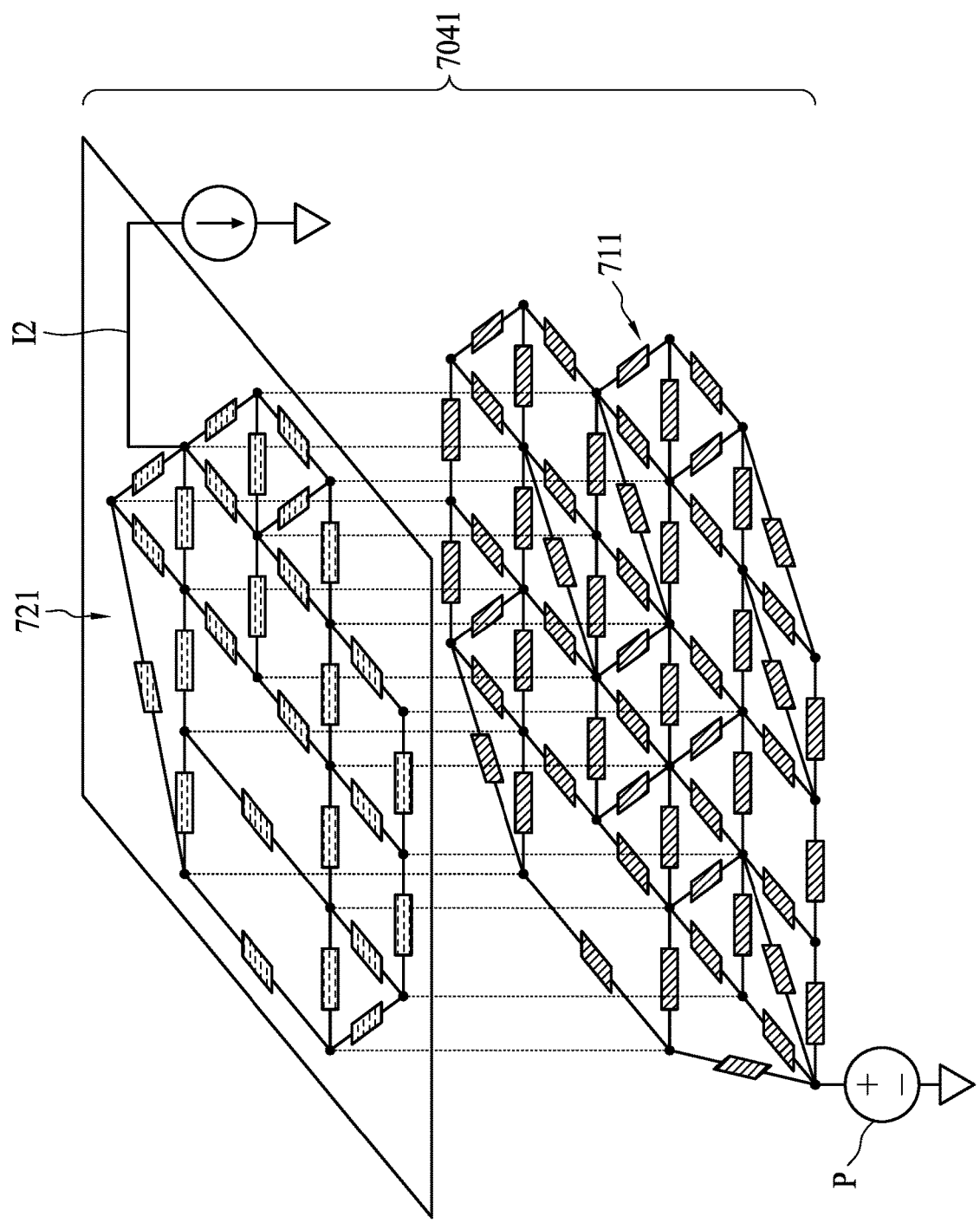

Referring to FIG. 11, within the second time period, the full power network 730 (shown in FIG. 7) is transformed into a second power network 7041 according to the second load region 704 (shown in FIG. 7). In some embodiments, a second power simulation is then performed on the second load region 704 based on the second current I2 passing through the second power network 7041 within the second time period. The second power network 7041 may include at least a portion of the first sub-power network 711 and at least a portion of the second sub-power network 721. Similar to the first power network 7021, the second power network 7041 may include a densely meshed region and a roughly meshed region, and the detailed description is omitted for brevity.

Figure 12:
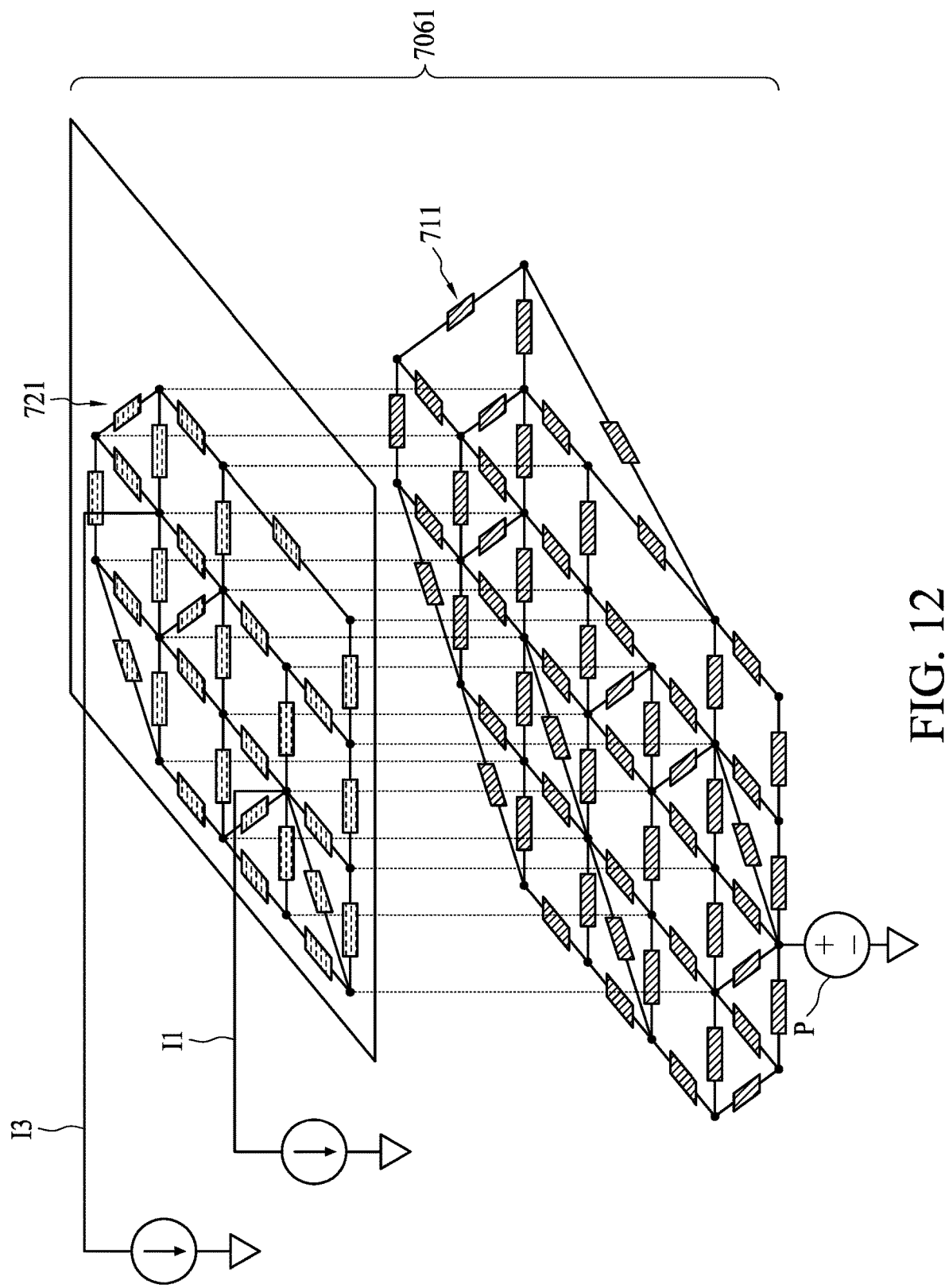

Referring to FIG. 12, within a third time period, the full power network 730 (shown in FIG. 7) is transformed into a third power network 7061 according to the first load region 702 and the third load region 706 (shown in FIG. 7), respectively. Similar to the configurations shown in FIG. 10 and FIG. 11, the third power network 7061 may include a densely meshed region and a roughly meshed region, and the detailed description is omitted for brevity. It should be noted that the third power network 7061 may be an equivalent circuit of the combination of the densely meshed region (i.e., corresponding to the first load region 702 and the third load region 706) and the roughly meshed region (i.e., corresponding to the second load region 704).

Briefly, referring to FIG. 10, FIG. 11, and FIG. 12, the first power network 7021, the second power network 7041, and the third power network 7061 are dynamically assigned according to the activities of the first load region 702, the second load region 704, and the third region 706 (shown in FIG. 7), respectively. For example, during the first time period, the first load region 702 is the main region for simulation, and the full power network 730 (shown in FIG. 9) may be transformed to the first power network 7021. The full power network 730 may be dynamically simplified or reduced into the first power network 7021, the second power network 7041, and the third power network 7061 within different time periods, respectively. The first power simulation is performed independently on the first power network 7021, the second power simulation is performed independently on the second power network 7041, and the third power simulation is performed independently on the third power network 7061. Thus, the simulation time may be decreased as the power simulation is performed on the simplified or reduced power network (i.e., the first power network 7021, the second power network 7041, or the third power network 7061), and the accuracy of the power simulation is still maintained. Moreover, depending on the requirements of the power simulation, the full power network 730 may also be transformed according to a plurality of load regions (e.g., the first load region 702 and the third load region 706) during the same time period.

Figure 13:
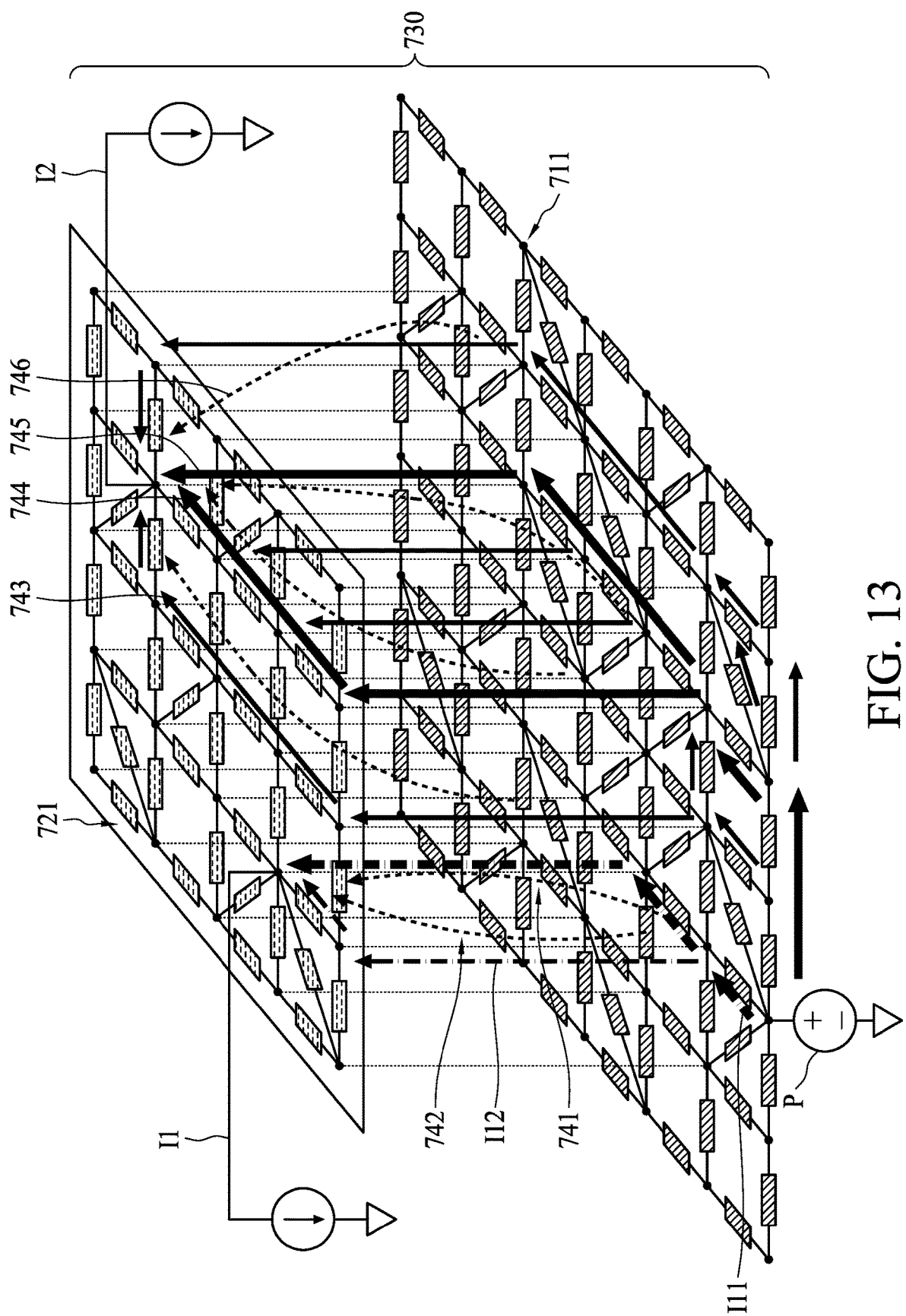
FIG. 13 is a diagram illustrating a power network of the IC in accordance with some embodiments of the present disclosure.

FIG. 13 is a diagram illustrating a power network of an IC in accordance with some embodiments of the present disclosure. Referring to FIG. 13, in some embodiments, the first sub-power network 711 is coupled to the second sub-power network 721 through a plurality of paths 741 to 746. It should be noted that the paths 741 to 746 are the routes through which the current may pass through and are not limited to the vias or connecting pad of the chip packages. As described with respect to FIG. 10 and FIG. 11, when the first current I1 or the second current I2 is applied to the first load region 702 or the second load region 704 (shown in FIG. 7) within the first time period or the second time period, the full power network 730 is transformed into a simplified or reduced power network (e.g., the first power network 7021 in FIG. 10 or the second power network 7041 in FIG. 11). In some embodiments, the full power network 730 may be simplified or reduced by obtaining the conductivity information of the paths 741 to 746. During the obtaining of the conductivity information, the paths 741 and 742 have the same starting point and ending point, and the paths 743 to 746 have the same starting point and ending point.

When the current I1 is applied, the current I1 may include a first sub-current I11 passing through the path 741 and a second sub-current I12 passing through the path 742. In some embodiments, the conductivity information of the path 741 and the path 742 based on the first sub-current I11 and the second sub-current I12, respectively, are obtained. The conductivity information may be an impedance of the paths 741 and 742. In one or more embodiments, when a ratio (Z1/Z2) of the impedance Z1 of the path 741 to the impedance Z2 of the path 742 is less than a predetermined threshold, the power simulation upon the load region (e.g., the first load region 702, the second load region 704, or the third load region 706 in FIG. 7) may utilize the path 741 without utilizing the path 742. For example, when the ratio (Z1/Z2) is less than 0.05, the power simulation utilizes only the path 741 without utilizing the path 742. The predetermined threshold is merely an example and is not intended to be limiting. Briefly, when the ratio (Z1/Z2) is less than the predetermined threshold, the impedance Z2 of the path 742 may be much greater than the impedance Z1 of the path 741, and the second sub-current I12 in the path 742 may be much smaller than the first sub-current I11 in the path 741. Thus, without utilizing the path 742, the full power network 730 may be simplified or reduced. Furthermore, since the second sub-current I12 in the path 742 is much smaller than the first sub-current I11 in the path 741, the second sub-current I12 may be negligible and the accuracy of the power simulation is still maintained.

In some embodiments, when the current I2 is applied, the current I2 may include a plurality of sub-currents passing through the paths 743 to 746. As described above, some of the paths may be negligible when the sub-current passing therethrough is much smaller than others. For example, the path 743 may be negligible when the impedance Z3 of the path 743 is much greater than the impedance Z4 of the path 744. The detailed description regarding negligible paths is described above and is omitted herein for brevity. In some other embodiments, when a ratio (Z4/Z5) of the impedance Z4 of the path 744 to an impedance Z5 of the path 745 is within a predetermined range, the power simulation upon the load region (e.g., the first load region 702, the second load region 704, or the third load region 706 in FIG. 7) may utilize the paths 744 and 745. For example, when the ratio (Z4/Z5) is within the range of 0.05 to 20, the power simulation utilizes the paths 744 and 745. The predetermined range is merely an example and is not intended to be limiting. Briefly, when the ratio (Z4/Z5) is within the predetermined range, the impedance Z4 of the path 744 may be in a non-negligible range compared to the impedance Z5 of the path 745. Thus, the power simulation may utilize a combination of the sub-currents in the paths 744 and 745. The combination of the sub-currents in the paths 744 and 745 may correspond to the ratio (Z4/Z5).

Moreover, in some other embodiments, the path 746 may have a considerable sub-current compared to the combination of the sub-currents in the paths 744 and 745. Therefore, the path 746 may be non-negligible and may not be combined with other paths. In short, while the current I2 is applied, the power network may be simplified to utilize only the combination of paths 744 and 745 and the path 746.

In conclusion, the negligible or combinable current paths may be determined by obtaining the conductivity information of each path, and the full power network may thus be simplified or reduced. It should be noted that the currents I1 and I2, and the paths 741 to 746 described with reference to FIG. 13 are merely examples and the method described here may be applied to the embodiments in FIG. 9 to FIG. 12.

Figure 14:
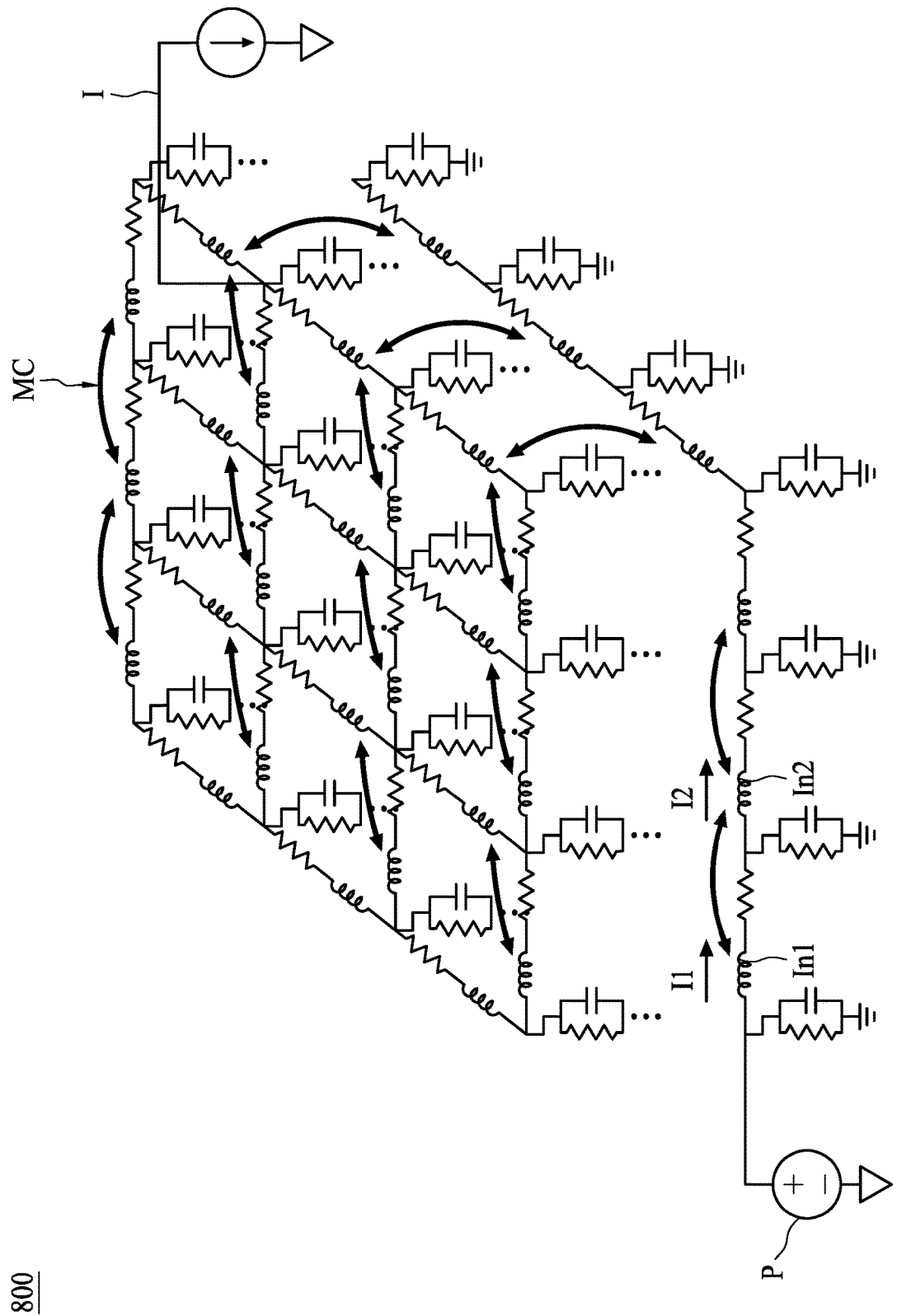
FIG. 14 is a diagram illustrating a power network of the IC in accordance with some embodiments of the present disclosure.

FIG. 14 is a diagram illustrating a power network of the IC in accordance with some embodiments of the present disclosure. Referring to FIG. 14, in some embodiments, an equivalent circuit of the power network 800 may be structured as a combination of resistors, capacitors, and inductors. As an example, the power network 800 may include a first inductive element In1 and a second inductive element In2 electrically connected to the first inductive element In1. The second inductive element In2 is downstream of the first inductive element In1.

In some embodiments, when the current I is applied to the power network 800, a first current I1 may pass through the first inductive element In1 and a second current I2 may pass through the second inductive element In2. During the power simulation, the magnetic coupling MC may occur between different inductive elements and the voltage of each inductive element may be calculated for estimating the magnetic coupling MC. For example, the voltage $V_{In1}$ of the first inductive element In1 may be expressed by equation (1). K is a constant of magnetic coupling. L1 and L2 are the inductances of the first inductive element In1 and the second inductive element In2, respectively. In some existing approaches, the simulation time may be increased as the variables (i.e., the currents I1, I2, etc.) are increased.

$$V_{In1} = L1\frac{dI1}{dt} + M\frac{dI2}{dt} \quad (1)$$

$$M = K\sqrt{L1L2} \quad (2)$$

In some embodiments of the present disclosure, the problem of increased simulation time mentioned above may be alleviated by determining the current profile of the current at the downstream position based on the current at the upstream position. For example, a current profile of the second current I2 passing through the second inductive element In2 may be determined based on the first current I1. The second current I2 passing through the second inductive element In2 may be expressed as a function of I1, for example, I2=f(I1). Thus, the $$\text{``}M\left(\frac{dI2}{dt}\right)\text{''}$$

in equation (1) may be rewritten as equation (3) and the equation (1) may be rewritten as equation (4).

$$M\frac{dI2}{dt} = M\frac{df(I1)}{dt} = Mf'(I1)\frac{dI1}{dt} \quad (3)$$

$$V_{In1} = (L1 + Mf'(I1))\frac{dI1}{dt} \quad (4)$$

As a result, the inductive component of the voltage $I_{In1}$ may be decomposed into an equivalent inductance (L1+Mf' (I1)) as a function of I1 and the voltage $V_{In1}$ thus only depends on I1. Briefly, the estimation of the voltage and the magnetic coupling may thus be simplified, and the simulation time may be decreased. It should be noted that the voltage $V_{In2}$ of the second inductive element In2 and the other voltage at the downstream inductive elements may be estimated with the same method as that used in the estimation of voltage $V_{In1}$. Moreover, the method described here may be applied to the embodiments in FIG. 2 to FIG. 5 and FIG. 9 to FIG. 12.

In conclusion, the power network may be dynamically assigned according to the activities of different load regions. The full power network may be dynamically simplified or reduced into the simplified power network within different time periods. Thus, the simulation time may be decreased as the power simulation is performed on the simplified or reduced power network, and the accuracy of the power simulation is still maintained. Moreover, some of the negligible or combinable current paths may be determined by obtaining the conductivity information of the paths in the power network, and the full power network may thus be simplified or reduced. Furthermore, the estimation of the magnetic coupling in the power network may be simplified by determining the current profile of the current at the downstream position based on the current at the upstream position.

Figure 15:
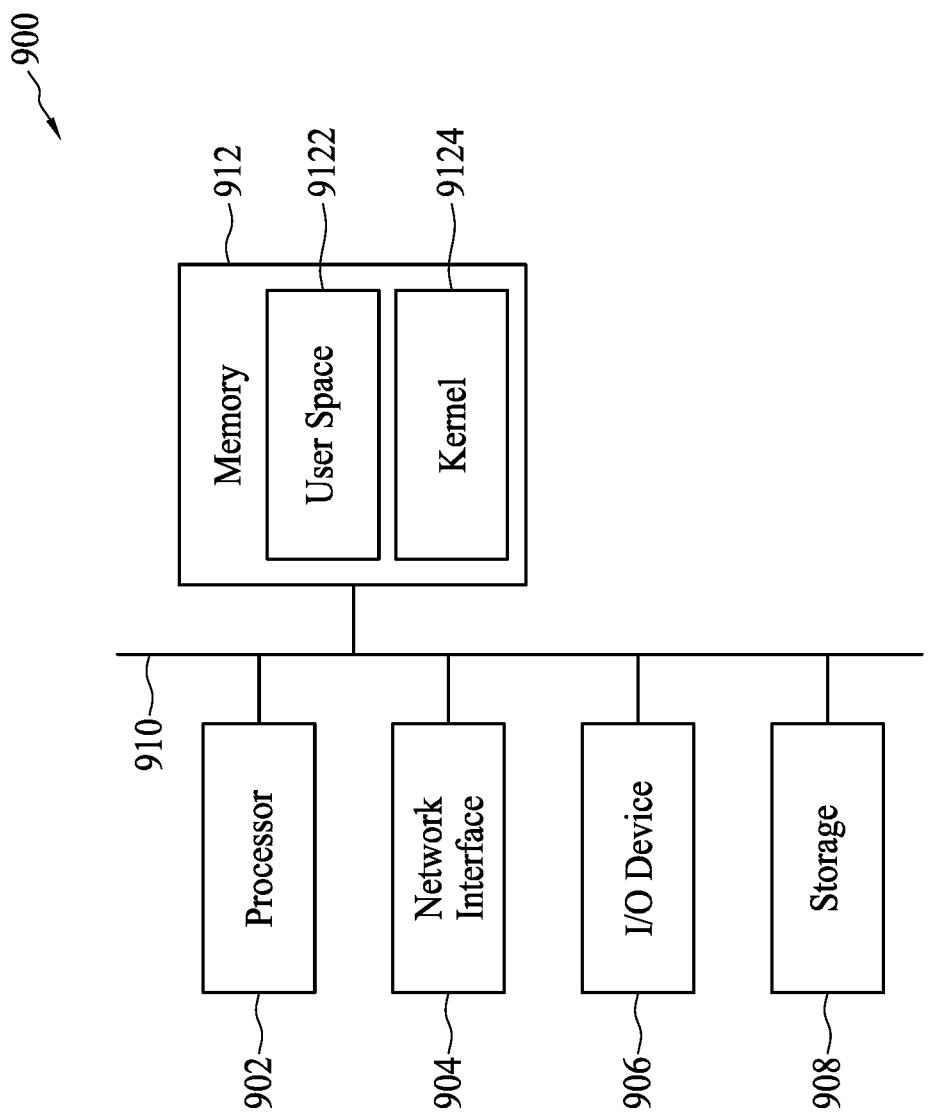
FIG. 15 is a diagram of a hardware system for implementing the post-layout simulation to perform the power simulation in accordance with some embodiments.

FIG. 15 is a diagram of a hardware system 900 for implementing the post-layout simulation 140 (or the post-layout simulation 640) to perform the power simulation in accordance with some embodiments. The system 900 includes at least one processor 902, a network interface 904, an input and output (I/O) device 906, a storage 908, a memory 912, and a bus 910. The bus 910 couples the network interface 904, the I/O device 906, the storage 908 and the memory 912 to the processor 902.

In some embodiments, the memory 912 includes a random access memory (RAM), another volatile storage device, read only memory (ROM), and/or other non-volatile storage device. The memory 912 includes a kernel 9124 and a user space 9122, configured to store program instructions to be executed by the processor 902 and data accessed by the program instructions.

In some embodiments, the network interface 904 is configured to access program instructions and data accessed by the program instructions stored remotely through a network. The I/O device 906 includes an input device and an output device configured for enabling user interaction with the system 900. The input device includes, for example, a keyboard, a mouse, or another input device. The output device includes, for example, a display, a printer, or another output device. The storage device 908 is configured for storing program instructions and data accessed by the program instructions. The storage device 908 includes, for example, a magnetic disk and an optical disk.

In some embodiments, when executing the program instructions, the processor 902 is configured to perform the operations of the post-layout simulation 140 (or the post-layout simulation 640) as described with reference to FIG. 1 (or FIG. 6).

In some embodiments, the program instructions are stored in a non-transitory computer readable recording medium such as one or more optical disks, hard disks and non-volatile memory devices.

Figure 16:
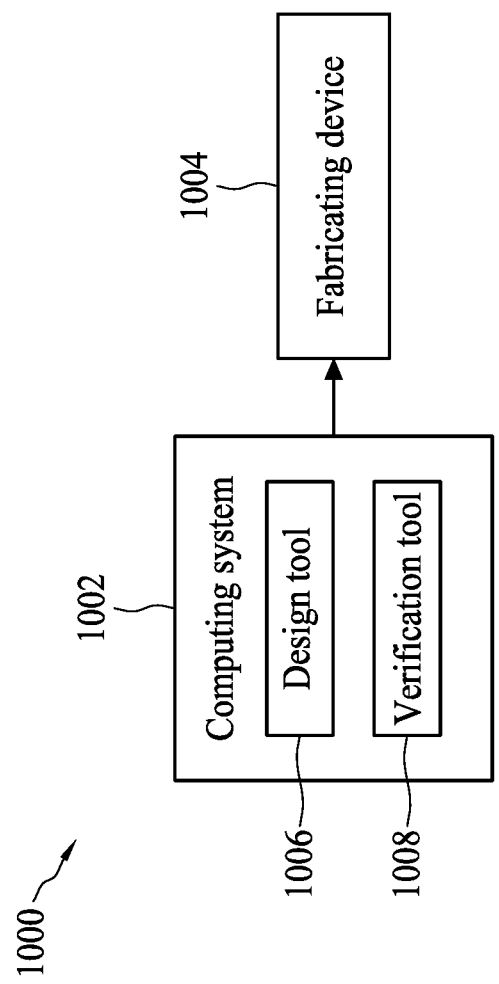
FIG. 16 is a diagram of a system for fabricating the IC in accordance with some embodiments.

FIG. 16 is a diagram of a system 1000 for fabricating the IC 800 in accordance with some embodiments. The system 1000 includes a computing system 1002 and a fabricating device 1004. The computing system 1002 is arranged to perform operations of the post-layout simulation 140 (or the post-layout simulation 640) to perform the power simulation. According to some embodiments, the computing system 1002 may include the hardware system 900 in FIG. 15. In some embodiments, the computing system 1002 may include a design tool 1006 and a verification tool 1008.

The design tool 1006 is arranged to provide a circuit layout including a first load region and a second load region, wherein the circuit layout includes a full power network. The design tool 1006 may be implemented by the processor 902 and the storage 908, in which the processor 902 may access the storage 908 to provide a stored circuit layout.

The verification tool 1008 is arranged to transform the full power network into a first power network according to the first load region and perform a first power simulation upon the first power network, and to transform the full power network into a second power network according to the second load region and perform a second power simulation upon the second power network. For brevity, the verification tool 1008 may transform the full power network using the operations described in FIG. 2 to FIG. 5 and FIG. 7 to FIG. 14. The verification tool 1008 may be implemented by the processor 902, wherein the processor 902 may transform the power network and perform the power simulation.

The fabricating device 1004 may be a cluster tool for fabricating the IC according to the circuit layout. The cluster tool may be a multiple reaction chamber type composite device which includes a polyhedral transfer chamber with a wafer handling robot inserted at the center of the transfer chamber, a plurality of process chambers positioned at each wall face of the polyhedral transfer chamber, and a load lock chamber installed at a different wall face of the transfer chamber. At the fabrication stage, at least one photomask is used on a wafer, for example, for one patterning operation for forming a feature of ICs, such as gate lines of transistors, source or drain regions for the transistors, metal lines for interconnects and vias for the interconnects.

According to some embodiments, a method for forming an integrated circuit (IC) is provided. The method includes the following operations. A circuit layout including a first load region and a second load region is received. A full power network of the circuit layout is obtained. The full power network is transformed into a first power network according to the first load region. A first power simulation upon the first power network is performed. The full power network is transformed into a second power network according to the second load region. A second power simulation is performed upon the second power network. The IC is fabricated according to the circuit layout.

According to other embodiments, a method for forming an integrated circuit (IC) is provided. The method includes the following operations. A first circuit layout and a second circuit layout over the first circuit layout are received. A first sub-power network and a second sub-power network of the first circuit layout and the second circuit layout, respectively, are obtained. The first sub-power network is coupled to the second sub-power network through a first path and a second path. The conductivity information of the first path and the second path is obtained. A power simulation is performed upon the first sub-power network, the second sub-power network, and at least one of the first path and the second path based on the conductivity information. The IC is fabricated according to the circuit layout.

According to other embodiments, a system for forming an integrated circuit (IC) is provided. The system includes a design tool, a verification tool, and a fabricating device. The design tool is arranged to provide a circuit layout including a first load region and a second load region. The circuit layout includes a full power network. The verification tool is arranged to transform the full power network into a first power network according to the first load region and perform a first power simulation upon the first power network, and to transform the full power network into a second power network according to the second load region and perform a second power simulation upon the second power network. The fabricating device is arranged to fabricate the IC according to the circuit layout.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for forming an integrated circuit (IC), the method comprising:
   receiving a circuit layout including a first load region and a second load region;
   obtaining a full power network of the circuit layout;
   transforming the full power network into a first power network according to the first load region, wherein the first power network includes a densely meshed region corresponding to the first load region and a roughly meshed region corresponding to the second load region;
   performing a first power simulation upon the first power network comprising simulating applying a first current to the first load region;
   transforming the full power network into a second power network according to the second load region, wherein the second power network includes a densely meshed region corresponding to the second load region and a roughly meshed region corresponding to the first load region;
   performing a second power simulation upon the second power network comprising simulating applying a second current to the second load region; and
   fabricating the IC according to the circuit layout.

2. The method of claim 1, wherein the simulating applying the first current to the first load region is carried out within a first time period.

3. The method of claim 2, wherein the performing of the first power simulation upon the first power network further comprises:
   performing the first power simulation upon the first load region based on the first current simulated passing through the first power network within the first time period.

4. The method of claim 2, wherein the IC is a three-dimensional IC including a first chip package and a second chip package stacked over the first chip package, and the first power network comprises a first sub-power network corresponding to the first chip package and a second sub-power network corresponding to the second chip package, and the first sub-power network is coupled to the second sub-power network through a first path and a second path.

5. The method of claim 4, wherein the first current comprises a first sub-current simulated passing through the first path and a second sub-current simulated passing through the second path, and the performing of the first power simulation upon the first power network further comprises:
   obtaining conductivity information of the first path and the second path based on the first sub-current and the second sub-current, respectively.

6. The method of claim 5, wherein the performing of the first power simulation upon the first power network further comprises:
   performing the first power simulation upon the first load region by utilizing the first path and without utilizing the second path when a ratio of an impedance of the first path to an impedance of the second path is less than 0.05.

7. The method of claim 5, wherein the performing of the first power simulation upon the first power network further comprises:
   performing the first power simulation upon the first load region by utilizing the first path and the second path when a ratio of an impedance of the first path to an impedance of the second path is within 0.05 to 20.

8. The method of claim 2, wherein the simulating applying the second current to the second load region in carried out within a second time period free from overlapping the first time period; and performing the second power simulation upon the second load region independently based on the second current passing through the second power network within the second time period.

9. The method of claim 8, wherein the circuit layout further comprises a third load region, and the method further comprises:
   transforming the full power network into a third power network according to the first load region and the third load region; and
   performing a third power simulation upon the third power network within a third time period free from overlapping the first time period and the second time period.

10. The method of claim 1, wherein the first power network comprises a first inductive element and a second inductive element electrically connected to the first inductive element and at a downstream position of the first inductive element, and the performing of the first power simulation upon the first power network comprises:
    applying a first current to the first inductive element.

11. The method of claim 10, wherein the performing of the first power simulation upon the first power network further comprises:
    estimating a voltage across the first inductive element based on the simulated first current.

12. The method of claim 11, wherein the estimating of the voltage across the first inductive element based on the simulated first current further comprises:
    determining a current profile of a second current simulated passing through the second inductive element based on the first current.

13. A method for forming a three-dimensional (3D) integrated circuit (IC) including a first chip package and a second chip package stacked over the first chip package, the method comprising:
    receiving a first circuit layout corresponding to the first chip package and a second circuit layout corresponding to the second chip package;

obtaining a first sub-power network and a second sub-power network of the first circuit layout and the second circuit layout, respectively, wherein the first sub-power network is coupled to the second sub-power network through a first path and a second path;

obtaining conductivity information of the first path and the second path;

performing a power simulation upon the first sub-power network, the second sub-power network, and at least one of the first path and the second path based on the conductivity information, comprising simulating applying a current to only one of the first path and the second path or simulating applying a first sub-current to the first path and applying a second sub-current to the second path; and fabricating the IC according to the first circuit layout and the second circuit layout.

14. The method of claim 13, wherein the obtaining the conductivity information of the first path and the second path further comprises:

simulating applying a current to the first path and the second path; and obtaining an impedance of the first path and an impedance of the second path.

15. The method of claim 14, wherein the performing the power simulation upon the first sub-power network, the second sub-power network, and at least one of the first path and the second path based on the conductivity information further comprises:

performing the power simulation upon the first sub-power network, the second sub-power network, and the first path when a ratio of the impedance of the first path to the impedance of the second path is less than 0.05.

16. The method of claim 14, wherein the performing of the power simulation upon the first sub-power network, the second sub-power network, and at least one of the first path and the second path based on the conductivity information further comprises:

performing the power simulation upon the first sub-power network, the second sub-power network, the first path, and the second path when a ratio of the impedance of the first path to the impedance of the second path is within 0.05 to 20.

17. A method for forming a three-dimensional (3D) integrated circuit (IC) including a first chip package and a second chip package stacked over the first chip package, the method comprising:

receiving a first circuit layout corresponding to the first chip package and a second circuit layout corresponding to the second chip package;

obtaining a first sub-power network and a second sub-power network of the first circuit layout and the second circuit layout, respectively;

transforming the first sub-power network and the second sub-power network into a first power network, wherein the first power network includes a densely meshed region and a roughly meshed region;

performing a first power simulation upon the first power network comprising simulating applying a first current to a first load region;

transforming the first sub-power network and the second sub-power network into a second power network different from the first power network, wherein the second power network includes a densely meshed region and a roughly meshed region;

performing a second power simulation upon the second power network comprising simulating applying a second current to a second load region; and fabricating the IC according to the first circuit layout and the second circuit layout.

18. The method of claim 17, wherein the IC is a three-dimensional IC.

19. The method of claim 18, wherein the first sub-power network is coupled to the second sub-power network through a first path and a second path.

20. The method of claim 17, wherein the first power network comprises a first inductive element and a second inductive element electrically connected to the first inductive element and at a downstream position of the first inductive element, and the performing of the first power simulation upon the first power network comprises:

simulating applying a first current to the first inductive element.

* * * * *